United States Patent
Nouhaud

(10) Patent No.: US 7,611,329 B2
(45) Date of Patent: Nov. 3, 2009

(54) METHOD AND DEVICE FOR SYNCHROPHASING THE PROPELLERS OF AN AIRCRAFT WITH SEVERAL PROPULSION UNITS

(75) Inventor: Christophe Claude Philippe Nouhaud, Brie Comte Robert (FR)

(73) Assignee: Hispano-Suiza, Colombes (FR)

( * ) Notice: Subject to any disclaimer, the term of this patent is extended or adjusted under 35 U.S.C. 154(b) by 420 days.

(21) Appl. No.: 11/546,247

(22) Filed: Oct. 12, 2006

(65) Prior Publication Data
US 2007/0084963 A1    Apr. 19, 2007

(30) Foreign Application Priority Data
Oct. 13, 2005   (FR) ................... 05 10435

(51) Int. Cl.
*F04D 27/00* (2006.01)
(52) U.S. Cl. ............... 416/35; 416/44; 700/30
(58) Field of Classification Search .......... 416/44, 416/35, 61; 700/30
See application file for complete search history.

(56) References Cited

U.S. PATENT DOCUMENTS

| | | | |
|---|---|---|---|
| 3,007,529 A * | 11/1961 | Brockert et al. ............... 416/34 |
| 3,515,961 A | 6/1970 | Allen, Jr. |
| 5,224,304 A * | 7/1993 | Cesna ........................ 451/28 |
| 5,335,175 A | 8/1994 | Turner |
| 5,453,943 A * | 9/1995 | Magliozzi ................... 700/280 |
| 5,551,649 A | 9/1996 | Kaptein |
| 5,789,678 A * | 8/1998 | Pla ............................. 73/660 |

* cited by examiner

*Primary Examiner*—Ninh H Nguyen
(74) *Attorney, Agent, or Firm*—Oblon, Spivak, McClelland, Maier & Neustadt, L.L.P.

(57) ABSTRACT

For constant-speed synchrophasing of the propellers (14) of the propulsion units (10) of an aircraft each equipped with an electronic control circuit (20) connected to a communications network (32) of the aircraft, each control circuit of a propulsion unit includes a clock delivering a clock signal at a frequency representing a rotational speed of the propulsion unit propeller corresponding to said constant speed, the control circuit clocks are kept substantially synchronous by communication via the communications network of the aircraft, and in each propulsion unit, the offset between the clock signal and a signal produced from a propeller rotational speed sensor is measured and compared to a determined propeller phase value assigned to the propulsion unit and, depending on the result of the comparison, an instantaneous variation of the propeller rotational speed is applied as necessary so as to bring the measured offset to the determined value.

9 Claims, 3 Drawing Sheets

METHOD AND DEVICE FOR SYNCHROPHASING THE PROPELLERS OF AN AIRCRAFT WITH SEVERAL PROPULSION UNITS

BACKGROUND OF THE INVENTION

The invention relates to constant-speed synchrophasing of the propellers of an aircraft having several propulsion units, each propulsion unit comprising an engine or a turbine and a propeller driven by the engine or the turbine.

In such aircraft, it is important for the comfort of the passengers to reduce cabin noise as much as possible. When they pass in the direction of the fuselage, the acoustic waves emitted by the propeller blades of the aircraft constitute a major source of noise. A significant noise reduction can be achieved by suitably distributing the acoustic wave impacts on the fuselage over time, in particular to avoid simultaneous impacts. To this end, the relative angular positions of the propellers of the different propulsion units are adjusted. This is what is meant by synchrophasing.

Synchrophasing the propellers of an aircraft to reduce cabin noise is well-known. The document U.S. Pat. No. 5,551,649 is representative, inter alia, of the prior art in this field.

Synchrophasing is implemented by maintaining the relative angular positions between propellers at predetermined values which may have been obtained during test flights. The relative angular position values can be expressed in the form of phase displacements between propellers, the phase of a propeller being then defined as the angular difference between the actual angular position of the propeller and a reference angular position common to all the propellers. The phase can be expressed in degrees, with one complete propeller rotation representing 360°.

Synchrophasing is performed at constant speed, that is to say, for the same constant rotational speed of the propellers. Several constant speeds can be adopted corresponding to different flight phases (cruising, takeoff, etc.) or to different flight conditions (wind, etc.) of the aircraft, the number thereof generally being limited. Different desirable phase displacement values can be determined for different respective constant speeds.

When the aircraft is operating, for a given constant speed, the objective is to maintain the actual values of phase displacement between the propellers equal to the determined desirable values.

To this end, provision is made in each propulsion unit for a sensor which delivers a signal indicating the angular position of the propeller. Such a sensor can, for example, comprise a magnetic element associated with a blade of the propeller and which passes across a fixed detector at each revolution.

In the prior art, one of the propulsion units of the aircraft is chosen as the "master" propulsion unit providing a reference of the angular position of the propeller. In the other or each of the other "slave" propulsion unit(s), the signal produced by the angular position sensor is compared with that provided by the master propulsion unit sensor in order to determine an actual phase displacement value. The latter is compared with the determined desirable value and, where it is different, an instantaneous variation of the propeller speed is applied to substantially cancel out this difference. The speed variation can be produced by acting on a propeller pitch control device interposed between the engine or the turbine and the propeller, in which case the latter is of the variable-pitch type.

One drawback of known architectures of this type lies in the existence of a point-to-point connection between the master propulsion unit and the other or each of the other slave propulsion unit(s) to transmit the signal from the angular position sensor of the propeller of the master propulsion unit. Such an electrical connection requires a particular cabling arrangement which is exposed to the risk of collapse and which, together with its insulation and fixing means, represents a not inconsiderable weight.

Furthermore, the existence of such point-to-point connections between the propulsion units creates a risk of propagation of failure and means that the different propulsion units cannot entirely be treated as independent identical entities, which can result in additional constraints for certification.

OBJECT AND SUMMARY OF THE INVENTION

The object of the invention is to propose a propeller synchrophasing method that does not present the aforementioned drawbacks.

This object is achieved, in a first embodiment of the invention, by a method of constant-speed synchrophasing of the propellers of the propulsion units of an aircraft, each equipped with an electronic control circuit connected to a communications network of an aircraft, a method wherein according to the invention:

- each control circuit of a propulsion unit includes a clock delivering a clock signal at a frequency representing a rotational speed of the propulsion unit propeller corresponding to said constant speed,
- the control circuit clocks are kept substantially synchronous by communication via the communications network of the aircraft, and
- in each propulsion unit, the offset between the clock signal and a signal produced from a propeller rotational speed sensor is measured and compared to a determined propeller phase value assigned to the propulsion unit, and, depending on the result of the comparison, an instantaneous variation of the propeller rotational speed is applied where necessary in order to bring the measured offset to the determined value.

In a second embodiment of the invention, this object is also achieved by a method of constant-speed synchrophasing of the propellers of propulsion units of an aircraft, each equipped with an electronic control circuit connected to an aircraft communications network, a method wherein according to the invention:

- each control circuit of a propulsion unit includes a clock delivering a clock signal at a frequency representing a rotational speed of the propulsion unit propeller corresponding to said constant speed,
- the control circuit clocks are kept substantially synchronous by communication via the communications network of the aircraft, and
- in each propulsion unit, the offset between the clock signal and a signal produced from a propeller rotational speed sensor is measured,
- information representing the offset measured in a "master" propulsion unit is transmitted, via the aircraft communications network, to the other or to each of the other "slave" propulsion unit(s) as a propeller phase reference value, and
- in the or each of the slave propulsion unit(s) the difference between the measured offset and the propeller phase reference value is compared to a determined propeller phase displacement setpoint value assigned to the slave propulsion unit and, depending on the result of the comparison, an instantaneous variation of the propeller rotational speed of the slave propulsion unit is applied as appropriate in order to bring the measured difference to the setpoint value.

Thus, in the method of the invention, a synchrophasing is implemented that does not require a point-to-point connection between the propulsion units, the synchrophasing being established either at the level of each propulsion unit by comparing the propeller phase (in relation to a local reference) with a setpoint phase value, or at the level of the or each of the "slave" propulsion unit(s) by comparing the measured phase displacement relative to the "master" propulsion unit with a setpoint phase displacement value between "slave" and "master".

According to a particular feature of the method, synchronisation of the clocks of the propulsion unit control circuits comprises:
  storage of the state of the internal clock in each propulsion unit control circuit in response to the receipt of a clock realignment control signal transmitted by a central control unit of the aircraft,
  transmission by the aircraft communications network of information representing the stored state of the internal clock of the control circuit of a predetermined propulsion unit to the control circuit of the other or each of the other propulsion unit(s) as a reference clock state, and
  in the other or each of the other propulsion unit(s), the stored clock state is compared to the reference clock state and, depending on the result of the comparison, a time realignment of the clock is effected as required.

The clock realignment control signal is preferably transmitted at least on the transition from one constant speed to another constant speed. It can also advantageously be transmitted periodically during a constant speed condition.

The clock realignment control signal can be transmitted to each electronic control circuit of a propulsion unit in different forms, in particular in the form of a digital control word on a data bus to which the electronic control circuit and the central control unit of the aircraft are connected, or an analogue signal applied to a dedicated input of the electronic control circuit, or a signal transmitted on an electrical power bus to which the electronic control circuit and the central control unit of the aircraft are connected.

A further object of the invention is to provide a device enabling the method to be put into effect.

According to the first embodiment of the invention, this object is achieved by virtue of a device for constant-speed synchrophasing of the propellers of an aircraft having several propulsion units and an aircraft central control unit, each propulsion unit including an electronic control circuit connected to an aircraft communications network and means of varying the propeller rotational speed, a device wherein, according to the invention, each electronic control circuit of a propulsion unit includes:
  an internal clock to deliver a clock signal at a predetermined frequency representing a propeller rotational speed corresponding to a constant speed,
  a sensor to produce a signal representing the propeller rotational speed,
  a circuit to measure the offset between the clock signal and the signal produced by the sensor, and
  a circuit to compare the measured offset with a determined propeller phase value assigned to the propulsion unit, and to produce, where necessary, a signal controlling the means of varying the propeller rotational speed depending on the result of the comparison, and in that:
  synchronisation circuits are provided to synchronise the clocks by communicating via the aircraft communications network in response to the receipt of a clock realignment control signal transmitted by the central control unit of the aircraft.

According to the second embodiment of the invention, this object is achieved by virtue of a device for constant-speed synchrophasing of the propellers of an aircraft having several propulsion units and an aircraft central control unit, each propulsion unit including an electronic control circuit connected to an aircraft communications network and means of varying the propeller rotational speed, a device wherein, according to the invention, each electronic control circuit of a propulsion unit includes:
  an internal clock to deliver a clock signal at a predetermined frequency representing a propeller rotational speed corresponding to a constant speed,
  a sensor to produce a signal representing the propeller rotational speed, and
  a circuit to measure the offset between the clock signal and the signal produced by the sensor,
  the electronic control circuit of a predetermined "master" propulsion unit additionally including a circuit enabling the transmission via the aircraft communications network of propeller phase reference information representing the offset measured by the control circuit of the "master" propulsion unit, and
  the or each of the electronic control circuit(s) of the or each of the other "slave" propulsion unit(s) additionally including a circuit to compare the difference between the offset measured by this control circuit and the propeller phase reference information received via the aircraft communication circuit with a determined propeller phase displacement value, and to produce, where necessary, a signal controlling the means of varying the propeller rotational speed depending on the result of the comparison, and in that:
  synchronisation circuits are provided to synchronise the clocks by communicating via the aircraft communications network in response to the receipt of a clock realignment control signal transmitted by the central control unit of the aircraft.

According to a particular feature of the device in the first or second embodiment of the invention:
  each electronic control circuit of a propulsion unit includes means of storing the state of its internal clock in response to the receipt of the clock realignment control signal,
  the electronic control circuit of a particular propulsion unit includes a circuit enabling the transmission over the aircraft communications network of reference clock state information representing the stored state of the clock of this electronic control circuit, and
  the or each of the electronic control circuit(s) of the or each of the other propulsion unit(s) includes means of comparing the stored state of its clock with the information representing the reference clock state received via the aircraft communications network, and to initiate, where necessary, a time realignment of its clock depending on the result of the comparison.

BRIEF DESCRIPTION OF THE DRAWINGS

Other particular features or advantages will become apparent upon reading the description given below by way of information but non-limitative with regard to the invention, in reference to the attached drawings in which.

DETAILED DESCRIPTION OF EMBODIMENTS

Figure 1:
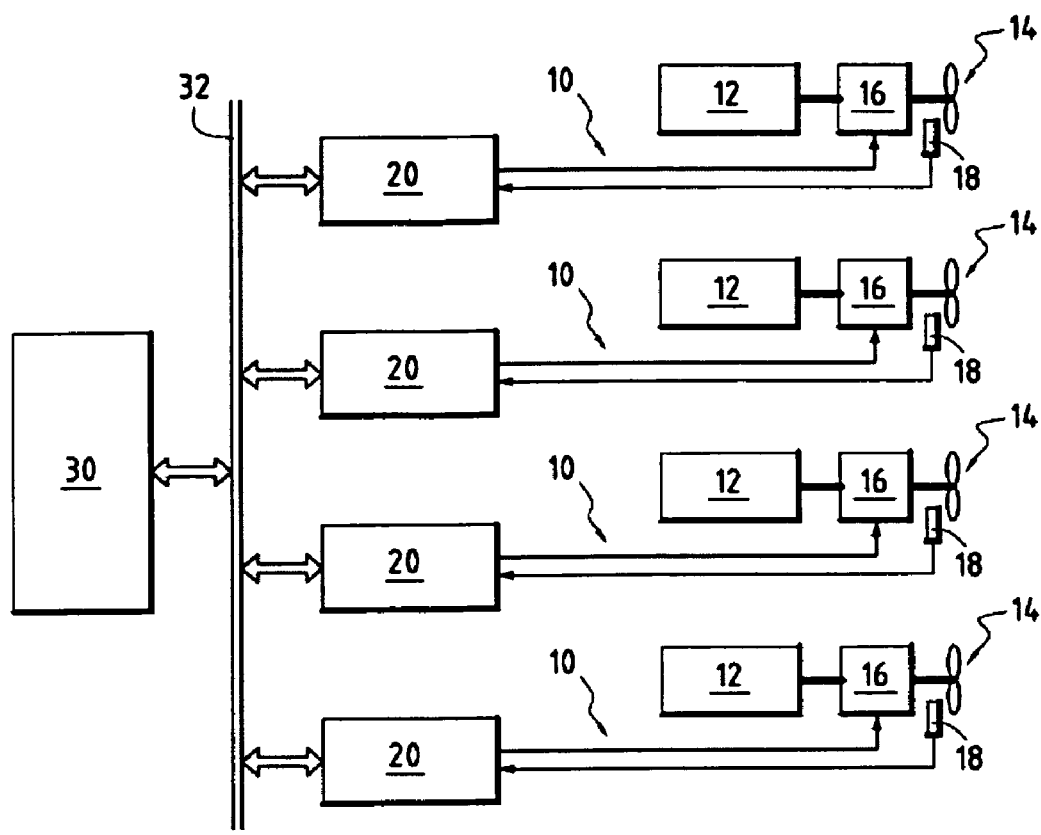
FIG. 1 is a highly schematic view of an architecture enabling propeller synchrophasing to be put into effect according to the invention.

The invention is applicable to aircraft equipped with two or more propulsion units. In the example in FIG. 1, an embodiment with four propulsion units 10 is envisaged.

Each propulsion unit comprises an engine or a turbine 12 which drives a propeller 14. A pitch variation control device is incorporated into a propeller driving device 16 interposed between the engine or turbine 12 and the propeller 14. The propeller being of the variable-pitch type, a modification of the pitch makes it possible, in a well-known manner, to vary the rotational speed of the propeller. A sensor 18 delivers a signal representing the actual rotational speed of the propeller 14.

Each propulsion unit additionally comprises an electronic control circuit 20. The latter is connected to a communications network 32 of the aircraft and to a central control unit 30 of the aircraft. Each control circuit 20 of a propulsion unit receives the sensor signal 18 from this unit and can produce a speed variation control signal applied to the propeller pitch control device 16.

The electronic control circuits 20 are powered by electrical power buses (not shown). Each engine or turbine 12 receives signals, in particular control signals transmitted by the central control unit via the communications network 32, and transmits signals in particular measurement or state signals which are also carried by the communications network 32. The signals intended for the engines or turbines 12 are received by them directly or via the control circuits 20.

Figure 2:
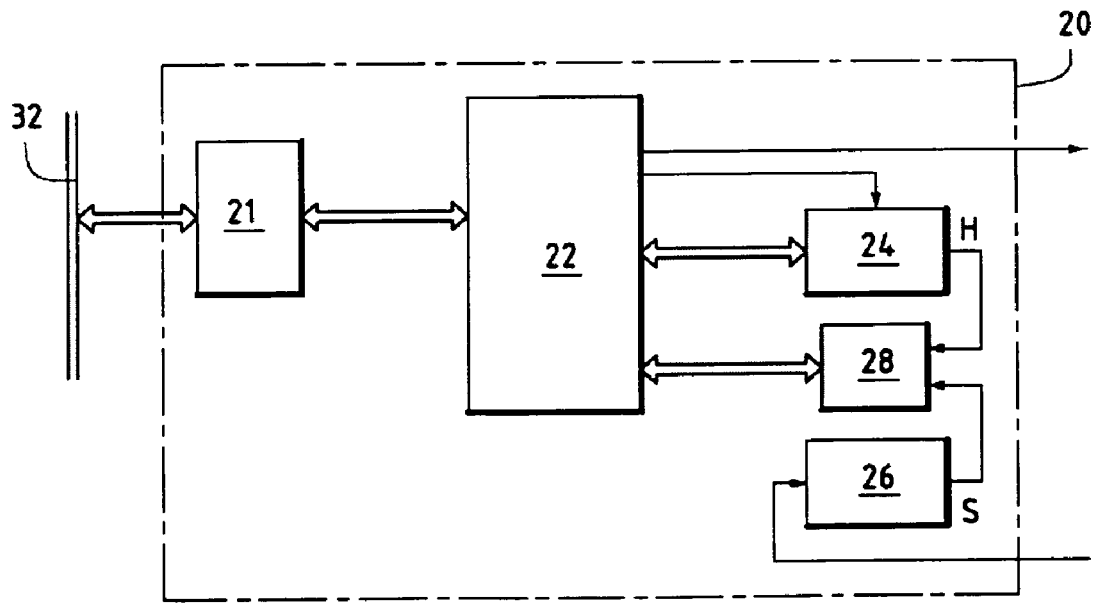
FIG. 2 is a block diagram of an electronic control circuit of a propulsion unit in the architecture of FIG. 1.
Figure 3:
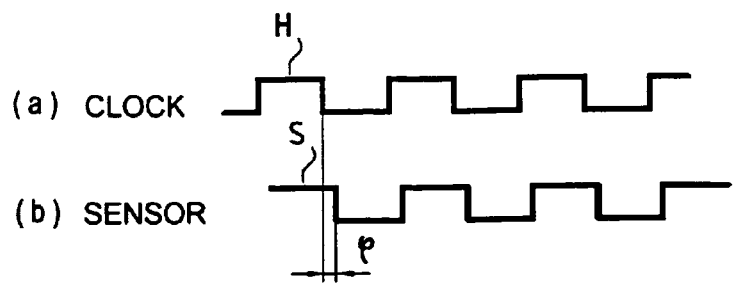
FIG. 3 illustrates the waveforms of signals used to measure the phase of a propeller of a propulsion unit.

A block diagram of an electronic control circuit 20 is shown in FIG. 2. It comprises a logic processing unit 22 which communicates with the network 32 via an interface 21. A clock 24, the synchronisation and frequency of which are controlled as the case may be by the processing unit 22, provides a clock signal H such as that shown, for example, on line (a) in FIG. 3. The signal produced by the propeller rotational speed sensor is conditioned by a circuit 26 which produces a signal S such as that shown for example on line (b) in FIG. 3.

Information representing propeller rotational speeds for a set of several constant speeds are stored in the logic unit 22. The selection, from the cockpit of the aircraft, of a particular constant speed is transmitted to the central control unit 30 and to the electronic control circuits 20 and is recognised by the processing unit 22. The latter generates a suitable control signal which is applied to the propeller pitch variation control device to apply a rotational speed corresponding to the selected speed. At the same time, the frequency of the clock signal is adjusted under the control of the processing unit 22 to represent the rotational speed corresponding to the constant speed selected.

The clock signal H and the signal S produced by the rotational speed sensor are applied to a circuit 28 designed to determine the offset (phase displacement) between these two signals. The offset determined represents the actual phase φ of the propeller relative to a reference provided by the clock signal. It will be noted that this is made possible by the fact that the actual rotational speed of the propeller is, in practice, equal or practically equal to that desired corresponding to the selected speed.

In a first embodiment, setpoint values of propeller phase, i.e. of angular position relative to a common reference, are assigned to each propulsion unit so as to obtain determined phase displacements between the propellers of the propulsion units in order to minimise cabin noise. For a first of the propulsion units, the assigned phase value can be arbitrary, for example 0°, the phases values assigned to the other units being determined in relation to the desired phase displacements relative to the first propulsion unit.

Figure 4:
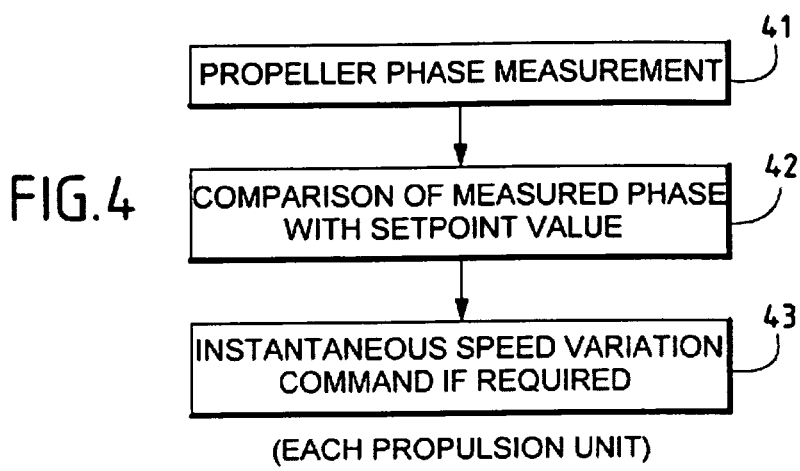
FIG. 4 illustrates a simplified flowchart of a synchrophasing process such as implemented in each propulsion unit, according to a first aspect of the invention.

As shown in FIG. 4, the synchrophasing process, therefore, comprises, in the or each of the propulsion unit(s), a measurement of the propeller phase (step 41), a comparison of the measured phase with the setpoint value assigned to the propulsion unit in question (step 42) and a command to instantaneously vary the propeller rotational speed if the difference between the measured and setpoint phase values is non-zero or exceeds an allowable threshold (step 43). When the difference is restored to the zero value or to a value below the maximum allowable threshold, the propeller is once again driven at the rotational speed corresponding to the selected constant speed.

The synchrophasing process is preferably performed continuously when the aircraft is in stabilised flying conditions, for example when the difference between the measured speed (propeller rotational speed) and the setpoint speed is below a determined threshold value. In effect, even in such stabilised conditions, the propeller is subject to disturbances of a mechanical nature (for example, movements of the aircraft) or aerodynamic nature (for example, turbulence) making it necessary to apply continuous synchrophasing as shown in FIG. 4. When the conditions are not stable, for example in the case of a large variation in airspeed or taxiing speed, the synchrophasing device can be deactivated.

In order to have a common reference for the propellers of the different propulsion units, the clocks 24 of the different control circuits 20 must be synchronous. A resynchronisation or time realignment of the clocks must be carried out to compensate for any drift. A clock realignment process will now be described in reference to FIGS. 5a, 5b and 6.

The clock realignment process 24 is triggered by the transmission by the central control unit 30 of a realignment control signal SYNC. This signal can be transmitted in the form of a digital control word on a data bus of the communications network 32 and is received by the electronic control circuit 20 of each propulsion unit.

Figure 5:
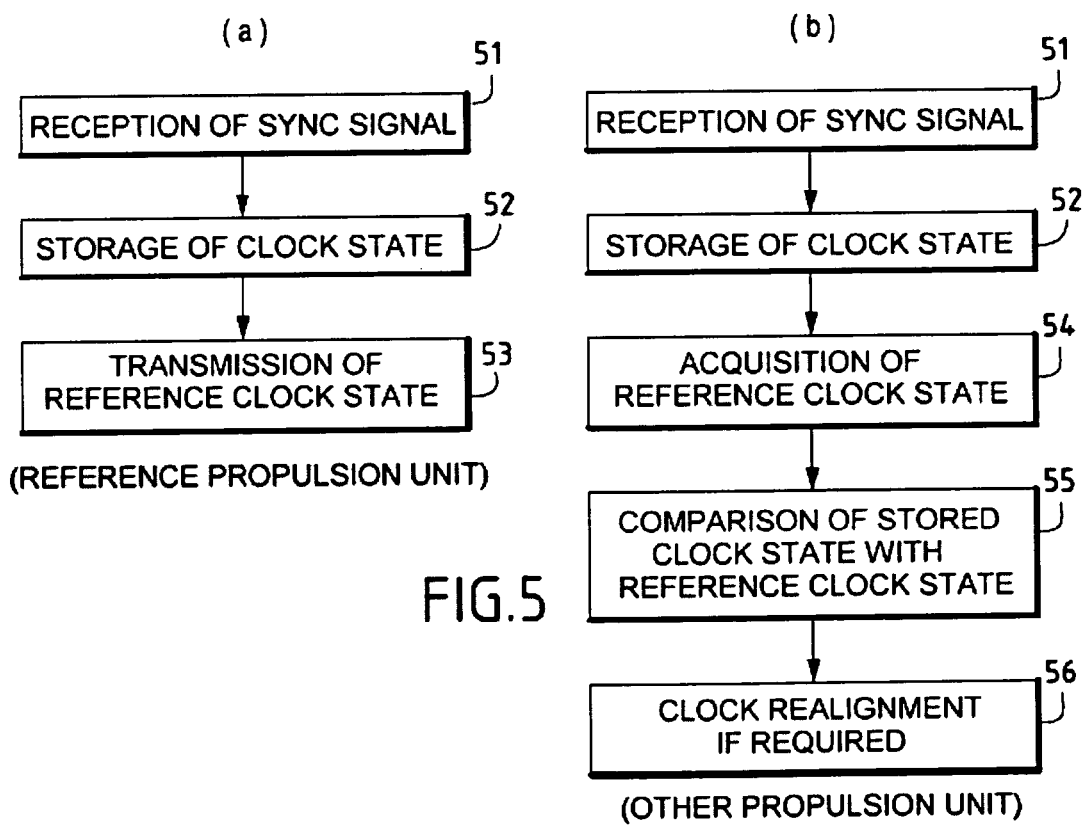
FIG. 5 illustrates a simplified flowchart of a clock realignment process such as implemented (a) in a reference propulsion unit and (b) in the other or each of the other propulsion unit(s)

In response to the recognition of the SYNC signal (step 51—FIGS. 5a, 5b), the processing units 22 simultaneously cause the states of the different clocks 24 to be stored (step 52—FIGS. 5a-5b). The clock state is represented by the value N of a counter which counts the oscillations produced by a very high frequency time base from which, in a well-known manner, the clock frequency is derived by division. Resetting of the counter to zero corresponds to a rising edge of the clock signal. The state N of the counter, therefore, represents the offset between the rising edge of the clock signal preceding the SYNC signal and the latter.

In a propulsion unit chosen arbitrarily as the reference, the clock state taken as the reference clock state $N_R$ is transmitted over the communications network 32 (step 53—FIG. 5a).

In the other or each of the other propulsion unit(s) the reference clock state $N_R$ is received (step 54—FIG. 5b) and is compared (step 55—FIG. 5b) with the local clock state. In case of a non-zero difference or one that is above a maximum allowable threshold, a realignment of the local clock is initiated so as to synchronise the latter with the reference clock (step 56—FIG. 5b).

Figure 6:
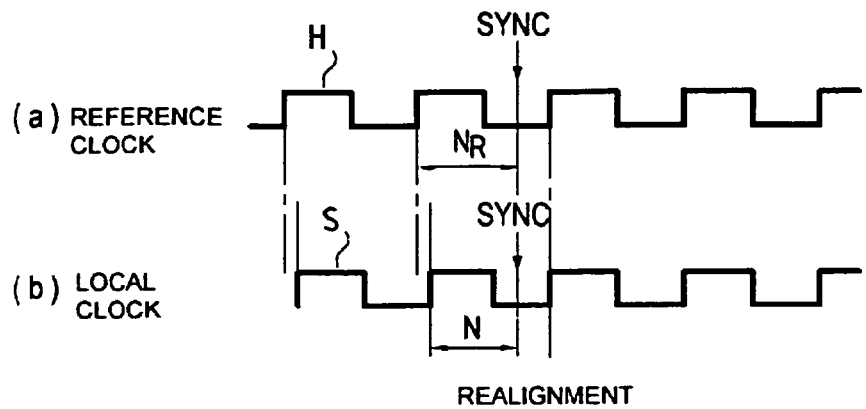
FIG. 6 illustrates the waveforms of signals used for the process in FIG. 5.

An example of realignment is illustrated in FIG. 6 in which line (a) represents the reference clock signal while line (b) represents the local clock signal of another propulsion unit, with realignment of the local clock to the reference clock following a difference measured between the clock states $N_R$ and N after receiving the SYNC signal.

The realignment can be effected by progressively modifying the state of the local clock counter by a value corresponding to the difference between the local clock and the reference clock at the storage instant.

The frequency with which a possible realignment of the clocks is applied by transmitting the SYNC signal can be chosen freely. It is not generally useful to adopt a high frequency. An interval of several seconds to several tens of seconds between two SYNC signals can be adopted. It is, however, useful to apply a clock realignment in the event of a transition of the propulsion units from one constant speed to another constant speed, the change of speed being accompanied by a change of frequency of the clocks.

Although the use of a pitch control device has been envisaged to modify the propeller rotational speed of a propulsion unit, other known devices capable of being controlled by the electronic control circuit of the propulsion unit can be provided for this purpose, for example a synchro-alternator modulating a torque applied to the propeller shaft so as to brake or accelerate the latter.

Furthermore, the SYNC signal used for temporal realignment of the clocks can be transmitted to the electronic control circuits of the propulsion units in a form other than a digital control word carried by a data bus.

Thus, the SYNC signal can be in the form of an analogue signal transmitted separately and received at a dedicated input of each electronic control circuit of a propulsion unit, which input can then be connected directly to the input controlling initialisation of the clock.

It is also possible to transmit the SYNC signal in the form of a modulation superimposed on an electrical power bus (power supply or earth bus) to which each electronic control circuit is connected. A demodulation circuit is then provided to recognise the SYNC signal and transmit it to the logic processing unit 22.

Figure 7:
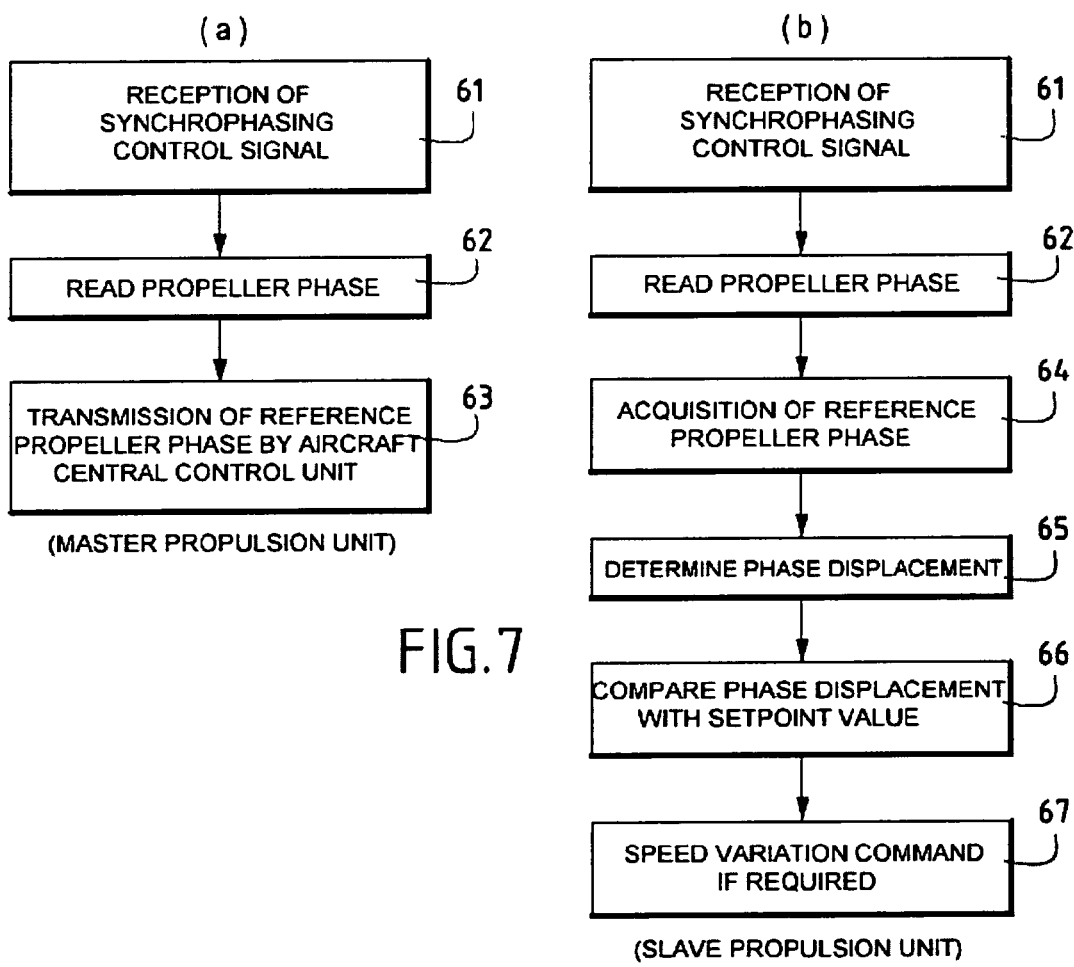
FIG. 7 illustrates simplified flowcharts of a synchrophasing process such as implemented (a) in a "master" propulsion unit and (b) in the other or each of the other "slave" propulsion unit(s), according to a second aspect of the invention.

Another embodiment of the synchrophasing process is illustrated in FIG. 7.

In this embodiment, one propulsion unit is chosen as the "master", and the other or each of the other propulsion unit(s) is the "slave". Setpoint values of propeller phase displacement are assigned to the or to each of the slave propulsion unit(s), corresponding to the desired phase displacement between the propeller of the slave propulsion unit and the propeller of the master propulsion unit in order to minimise cabin noise. The operating principle is as follows.

The internal clocks of the control circuits of the "master" and "slave" propulsion units are synchronised in response to the reception of clock alignment SYNC signals in the same manner as described above.

In each propulsion unit the propeller phase corresponding to the offset φ between the clock signal H and the signal S produced by the sensor, such as determined by the circuit 28, is read by the processing unit 22 (step 62—FIGS. 7a-7b). The propeller phase of the master propulsion unit is transmitted continuously over the aircraft communications network as a reference propeller phase (step 63, FIG. 7a).

In the or each of the slave propulsion unit(s), the reference propeller phase value is received and acquired (step 64—FIG. 7b) via the aircraft communications network and the phase displacement between the propeller of the "slave" propulsion unit and that of the "master" propulsion unit is determined from the two available phase values (step 65—FIG. 6b). The determined phase displacement is compared with the setpoint phase displacement value assigned to the "slave" propulsion unit (step 66—FIG. 6b). If the difference between the two phase displacements is non-zero or above a maximum allowable threshold value, an instantaneous variation of the propeller speed of the "slave" propulsion unit is applied (step 67—FIG. 6b), so as to reduce this difference to zero or to a value below the maximum allowable threshold, and the propeller speed is then brought to the value corresponding to the currently selected constant speed. The speed variation is produced by acting on the propeller pitch variation control device.

As in the previous embodiment, the synchrophasing process is preferably performed continuously while the flight conditions are stable.

It is possible however, in one or other of the embodiments, to run the synchrophasing process in a periodic manner.

The invention claimed is:

1. A method of constant-speed synchrophasing of the propellers of the propulsion units of an aircraft, each equipped with an electronic control circuit connected to a communications network of the aircraft, said method comprising the steps of:
    providing, in each control circuit of a propulsion unit, a clock delivering a clock signal at a frequency representing a rotational speed of the propulsion unit propeller corresponding to said constant speed,
    keeping the clocks substantially synchronous by communication via the communications network of the aircraft,
    measuring, in each propulsion unit, an offset between the clock signal and a signal produced from a propeller rotational speed sensor,
    transmitting information representing the offset measured in a "master" propulsion unit, via the aircraft communications network, to the other or to each of the other "slave" propulsion unit(s) as a propeller phase reference value, and
    comparing, in the or each of the slave propulsion unit(s), the difference between the measured offset and the propeller phase reference value to a determined propeller phase displacement setpoint value assigned to the slave propulsion unit and, depending on a result of the comparing, applying an instantaneous variation of the propeller rotational speed of the slave propulsion unit as appropriate in order to bring the measured difference to the setpoint value.

2. The method according to claim 1, wherein the step of keeping the clocks of the propulsion unit control circuits substantially synchronous comprises:
    storing the state of the internal clock in each propulsion unit control circuit in response to the receipt of a clock realignment control signal transmitted by a central control unit of the aircraft, transmitting, by the aircraft communications network, information representing the stored state of the internal clock of the control circuit of a predetermined propulsion unit to the control circuit of the other or each of the other propulsion unit(s) as a reference clock state, and comparing, in the other or each of the other propulsion unit(s), the stored clock state to the reference clock state and, depending on the result of the comparison, effecting a time realignment of the clock as required.

3. The method according to claim 2, wherein the clock realignment control signal is transmitted from one constant speed to another constant speed.

4. The method according to claim 2, wherein the clock realignment control signal is transmitted periodically during a constant speed condition.

5. The method according to claim 2, wherein the clock realignment control signal is transmitted to each electronic control circuit of a propulsion unit in the form of a digital control word on a data bus to which the electronic control circuit and the central control unit of the aircraft are connected.

6. The method according to claim 2, wherein the clock initialisation control signal is transmitted to each electronic control circuit of a propulsion unit in the form of an analogue signal applied to a dedicated input of the electronic control circuit.

7. The method according to claim 2, wherein the clock initialisation control signal is transmitted to each electronic control circuit of a propulsion unit in the form of a signal transmitted on an electrical power bus to which the electronic control circuit and the central control unit of the aircraft are connected.

8. A device for constant-speed synchrophasing of the propellers of an aircraft having several propulsion units and an aircraft central control unit, each propulsion unit including an electronic control circuit connected to an aircraft communications network and means of varying the propeller rotational speed, wherein:

each electronic control circuit of a propulsion unit includes:

an internal clock to deliver a clock signal at a predetermined frequency representing a propeller rotational speed corresponding to a constant speed, a sensor to produce a signal representing the propeller rotational speed, and a circuit to measure the offset between the clock signal and the signal produced by the sensor, the electronic control circuit of a predetermined "master" propulsion unit additionally including a circuit enabling the transmission via the aircraft communications network of propeller phase reference information representing the offset measured by the control circuit of the "master" propulsion unit, and the or each of the electronic control circuit(s) of the or each of the other "slave" propulsion unit(s) additionally including a circuit to compare the difference between the offset measured by this control circuit and the propeller phase reference information received via the aircraft communication circuit with a determined propeller phase displacement value, and to produce, where necessary, a signal controlling the means of varying the propeller rotational speed depending on the result of the comparison, and in that:

synchronisation circuits to synchronise the clocks by communicating via the aircraft communications network in response to the receipt of a clock realignment control signal transmitted by the central control unit of the aircraft.

9. A devices according to claim 8, wherein:

each electronic control circuit of a propulsion unit includes means for storing the state of its internal clock in response to the receipt of the clock realignment control signal, the electronic control circuit of a particular propulsion unit includes a circuit enabling the transmission over the aircraft communications network of reference clock state information representing the stored state of the clock of this electronic control circuit, and the or each of the electronic control circuit(s) of the or each of the other propulsion unit(s) comprises means for comparing the stored state of its clock with the information representing the reference clock state received via the aircraft communications network, and to initiate, where necessary, a time realignment of its clock depending on the result of the comparison.

* * * * *